US006735653B2

(12) United States Patent
O Mathuna et al.

(10) Patent No.: US 6,735,653 B2
(45) Date of Patent: May 11, 2004

(54) BUS BANDWIDTH CONSUMPTION PROFILER

(75) Inventors: Padraig Gerard O Mathuna, San Jose, CA (US); Marc Gerardus Klaassen, Saratoga, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 463 days.

(21) Appl. No.: 09/785,845

(22) Filed: Feb. 16, 2001

(65) Prior Publication Data

US 2002/0116562 A1 Aug. 22, 2002

(51) Int. Cl.⁷ .............................................. G06F 13/42
(52) U.S. Cl. .................... 710/105; 710/117; 710/116; 710/107; 710/110; 377/115
(58) Field of Search ............................ 710/116, 107, 710/110, 117, 105; 377/115

(56) References Cited

U.S. PATENT DOCUMENTS

| | | | |
|---|---|---|---|
| 4,789,926 A | * 12/1988 | Clarke | 710/116 |
| 5,499,345 A | 3/1996 | Watanabe | |
| 5,506,969 A | 4/1996 | Wall et al. | |
| 5,560,016 A | 9/1996 | Fiebrich et al. | |
| 5,564,025 A | 10/1996 | De Freese et al. | |
| 5,623,672 A | * 4/1997 | Popat | 710/240 |
| 5,740,380 A | 4/1998 | LaBerge et al. | |
| 5,771,358 A | 6/1998 | LaBerge | |
| 5,778,194 A | * 7/1998 | McCombs | 713/600 |
| 5,778,200 A | * 7/1998 | Gulick | 710/113 |
| 5,845,097 A | * 12/1998 | Kang et al. | 710/117 |
| 5,956,493 A | * 9/1999 | Hewitt et al. | 710/113 |
| 6,018,560 A | * 1/2000 | Kim | 377/123 |
| 6,018,803 A | * 1/2000 | Kardach | 713/323 |
| 6,058,450 A | 5/2000 | LaBerge | |
| 6,122,693 A | * 9/2000 | Gutta et al. | 710/107 |
| 6,145,040 A | 11/2000 | LaBerge et al. | |
| 6,178,475 B1 | * 1/2001 | O'Brien | 710/116 |
| 6,222,900 B1 | * 4/2001 | Hara | 377/107 |
| 6,226,702 B1 | * 5/2001 | Yakashiro | 710/107 |

FOREIGN PATENT DOCUMENTS

| | | | | |
|---|---|---|---|---|
| JP | 63128461 A | * | 6/1988 | G06F/13/36 |
| JP | 11238035 A | * | 8/1999 | G06F/13/362 |

OTHER PUBLICATIONS

"Concurrent/Real Time Arbitration Utilization Circuit," IBM Technical Disclosure Bulletin, Dec. 1994, pp. 111–114.*

* cited by examiner

Primary Examiner—Xuan M. Thai
Assistant Examiner—Donna K. Mason
(74) Attorney, Agent, or Firm—Aaron Waxler (57) ABSTRACT

A bus bandwidth consumption profiler for measuring and reporting bus cycle utilization in a system having multiple bus masters, including master counters paired with the masters to count cycles of bus ownership, and a realtime counter to count elapsed cycles between profile events generated by either a realtime counter roll-over, or a system read signal. Upon a profile event, the counts of the master counters are simultaneously output to the system and the realtime count is determined. Alternatively, the profiler includes a total counter for counting the combined bus cycles owned by all masters, and fewer master counters than masters, each configurable to count a selected master. Upon a profile event, the counts of the master counters, the total counter, and the realtime counter are simultaneously output to the system. Accordingly, the bandwidth consumption of the selected masters and the combined, non-selected masters, can be calculated using fewer counters.

20 Claims, 9 Drawing Sheets

BUS BANDWIDTH CONSUMPTION PROFILER

FIELD OF THE INVENTION

The present invention generally relates to devices for measuring the bandwidth consumption of bus masters in a CPU-based system, and more particularly to a bus bandwidth consumption profiler which counts bus cycles owned by the bus masters over a period of time and simultaneously stores the number of owned bus cycles for output to the system to permit calculation of bus bandwidth consumption.

BACKGROUND OF THE INVENTION

In a variety of CPU-based systems, a microprocessor communicates with memory devices over a communications bus. The microprocessor and other such bus masters, including the system UART, ethernet controller, etc., may function as data producers by placing data on the bus for storage in the memory devices (bus slaves), or as data consumers by removing data placed on the bus by the bus slaves. Either way, access to the bus by the bus masters is typically controlled by a bus arbiter which ensures that only one bus master drives the bus at any given time to avoid short circuits and damage to the system components.

More specifically, bus masters communicate over the bus by setting up a data transaction with the bus arbiter, executing the transaction, and acknowledging its conclusion. The amount of time (or number of clock cycles) a bus master has ownership of the bus during a given time period is proportional to the bus bandwidth consumption of that bus master. Between data transactions, dead time is provided to prevent two bus masters from simultaneously owning the bus. Accordingly, at least one dead cycle is typically required for every data transaction. As is well known in the art, the efficiency of the bus in terms of data transferred per unit time is decreased by each dead cycle. Since various bus masters are designed to transfer data at various data rates, a theoretical maximum efficiency exists for a given system of bus masters. If the clock speed (or frequency) of the bus is faster than the speed corresponding to maximum efficiency for the system, then the clock speed should be reduced to reduce power consumption. Accordingly, the more precisely the bandwidth consumption of the bus masters can be determined, the lower the system clock speed can be while maintaining the same throughput.

Conventional systems employ hard-wired logic circuits to measure bus bandwidth consumption. These circuits may also be incorporated in a system feedback loop to adjust the system clock speed in response to dynamic changes in bandwidth consumption. Such hardware-based systems, however, are undesirable for a variety of reasons. Clock frequency in hardware systems without bandwidth consumption feedback is based solely on estimates of the bandwidth consumption of the various bus masters. If the estimates are overly conservative (i.e., the clock frequency is higher than necessary to accommodate the desired throughput), then the entire chip design is undesirable because it consumes excessive power. Even hardware systems which incorporate bandwidth consumption feedback and clock speed adjustment are deficient because the intelligence used to adjust the clock speed is hard-wired and incapable of being adapted to different applications.

SUMMARY OF THE INVENTION

The present invention provides a bus bandwidth consumption profiler for measuring and reporting bus cycle utilization in a computer system having multiple bus masters and a bus arbiter for granting the masters ownership of the bus. In one embodiment, the profiler includes multiple master counters and a realtime counter. The master counters are individually paired with the bus masters to count cycles of bus ownership by their corresponding bus master. The realtime counter counts all bus cycles that occur during a time period ending with a profile event. Depending upon the profiler architecture, the profile event may occur when the realtime counter reaches its maximum count value (roll-over), or when the computer system provides a read signal to the profiler. When either profile event occurs, the current cycle counts of the master counters are simultaneously stored for output to the system. The realtime counter count is either known when the profile event is a realtime counter roll-over, or is stored at the time the cycle counts of the master counters are stored. A system designer may access these snap-shots of bus utilization to determine bus bandwidth consumption of the bus masters and tailor the system clock frequency to the desired system throughput, thereby minimizing system power consumption. The profiler may also be used in a system feedback loop to permit dynamic adjustment to the system clock frequency according to algorithms stored in the system CPU.

In another embodiment, the profiler uses fewer master counters than the number of bus masters in the system. Each master counter is configurable to count bus cycles owned by a selected master. A total counter may also be provided to count the combined bus cycles owned by all bus masters. Upon the occurrence of a profile event, the count data of the master counters, the total counter, and the realtime counter is simultaneously determined. Accordingly, the bus bandwidth consumption of the selected masters, as well as of the combined, non-selected masters, can be calculated using a reduced number of counters. This embodiment may likewise be employed as a design tool or as a bandwidth consumption monitoring device in a clock frequency correction feedback loop.

BRIEF DESCRIPTION OF THE DRAWINGS

These and other features will become more apparent and the present invention will be better understood upon consideration of the following description and the accompanying drawings wherein.

DESCRIPTION OF EMBODIMENTS OF THE INVENTION

The embodiments of the invention described herein are not intended to be exhaustive or to limit the invention to the precise forms disclosed. Rather, the embodiments selected for description have been chosen to enable one skilled in the art to practice the invention.

Figure 1:
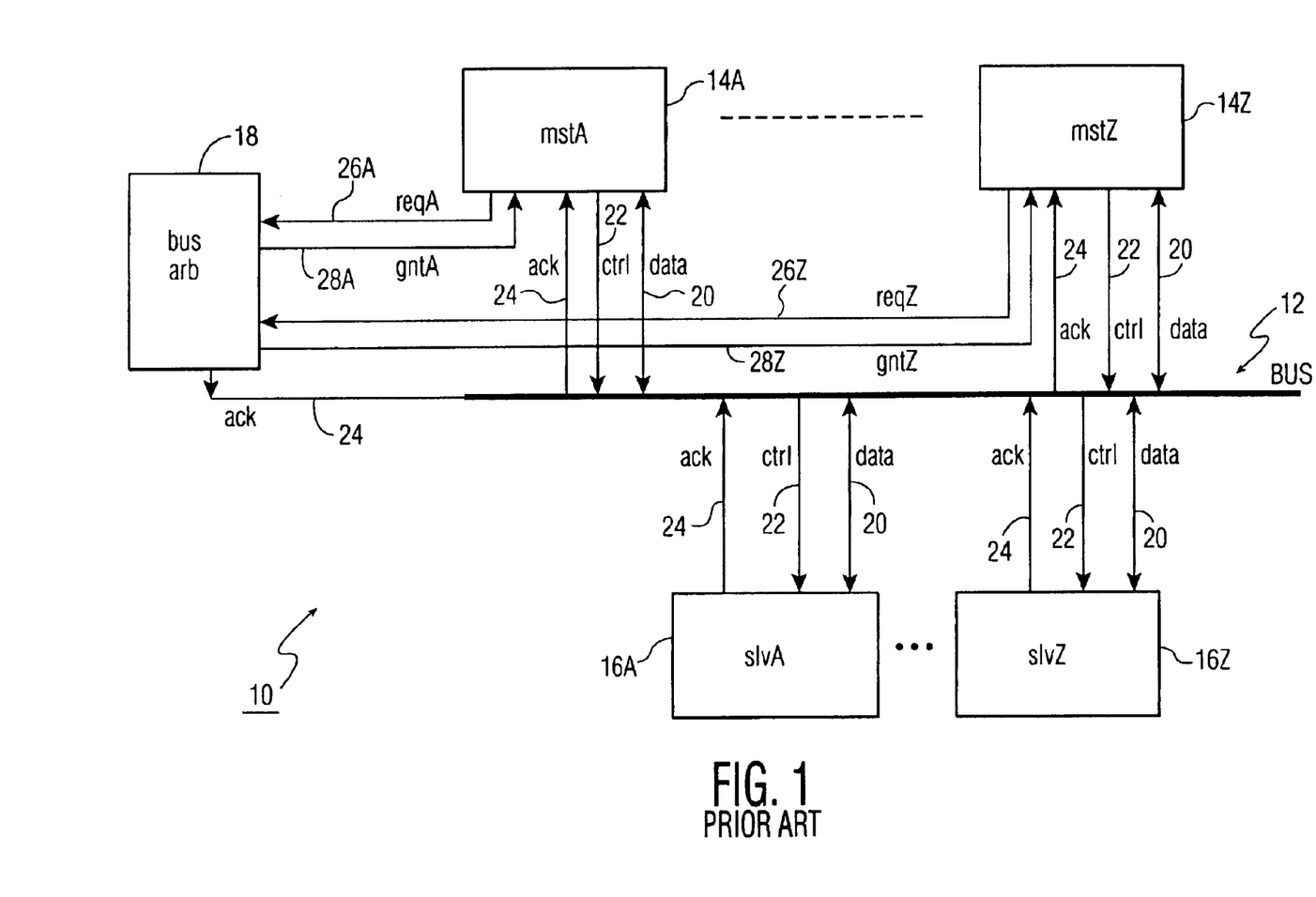
FIG. 1 is a block diagram of the architecture of a basic bus system.

Referring now to FIG. 1, a conventional bus system 10 includes a bus 12, a plurality of bus masters 14A–14Z (two shown), a plurality of bus slaves 16A–16Z (two shown), and a bus arbiter 18. Bus 12 includes common data lines 20 and common control lines 22 connected between masters 14A–14Z and slaves 16A–16Z, and common acknowledge lines 24 connected between masters 14A–14Z, slaves 16A–16Z, and arbiter 18. Masters 14A–14Z are connected to arbiter 18 by request lines 26A–26Z and grant lines 28A–28Z, respectively.

Figure 2:
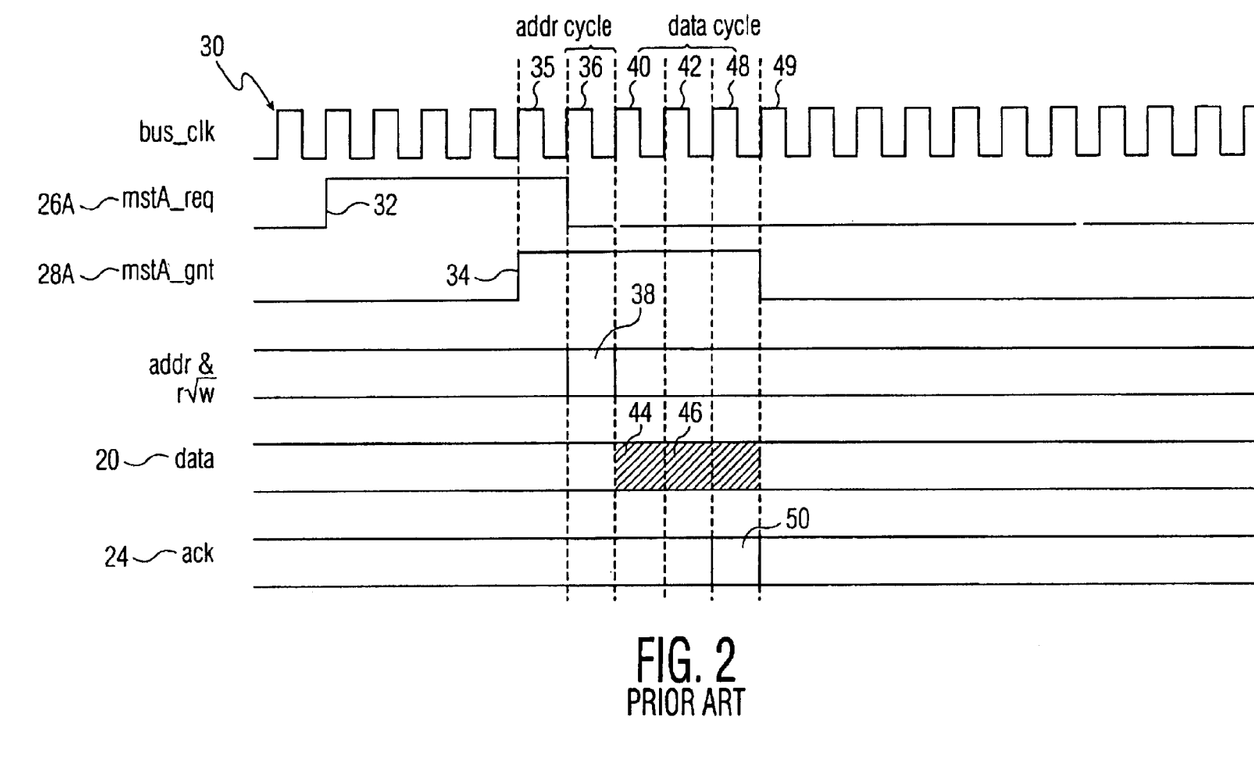
FIG. 2 is a timing diagram illustrating a data transaction in a bus system.

FIG. 2 illustrates a typical data transaction carried out in bus system 10 by master 14A. As shown, a bus clock signal 30 runs continuously, and determines the timing by which data transactions may be executed. The data transaction begins when master 14A requests access or ownership of bus 12 by outputting a request signal 32 on request line 26A to arbiter 18. In the example, arbiter 18, upon evaluating the priority of request signals from masters 14A–14Z, grants master 14A ownership of bus 12 at bus clock cycle 35 by outputting a grant signal 34 on grant line 28A. During clock cycle 36, master 14A outputs a signal 38 representing the address of a slave 16A–16Z and a command to either read data from or write data to the addressed location. During clock cycles 40, 42, master 14A either reads data 44, 46 from the addressed slave, or writes data to the addressed slave. Finally, during clock cycle 48, the addressed slave outputs an acknowledge signal 50 on acknowledge line 24 to master 14A and arbiter 18 indicating that the data transaction is complete. Master 14A may either relinquish ownership of bus 12, or maintain ownership to execute more data transactions. In the example shown, master 14A relinquishes ownership of bus 12. Clock cycles 35 and 49 represent dead time during which no data exchange is taking place.

Figure 3:
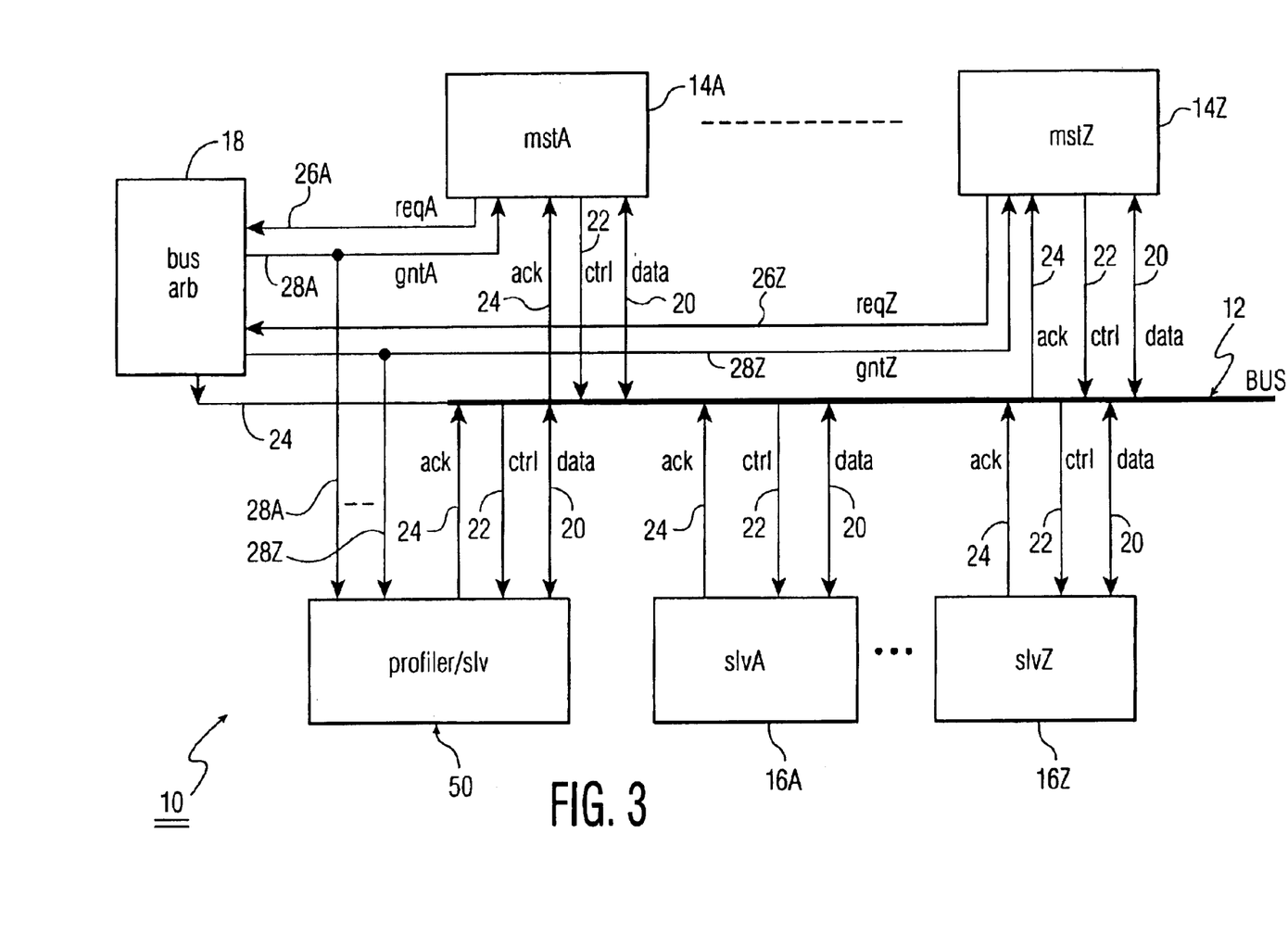
FIG. 3 is a block diagram of the architecture of a basic bus system including a bus bandwidth profiler according to the present invention.

Referring now to FIG. 3, a bus bandwidth profiler 50 according to the present invention is shown connected to conventional bus system 10. As shown, data lines 20, control lines 22, acknowledge lines 24, and grant lines 28A–28Z are connected to profiler 50. It should be understood that profiler 50 may function either as a profiler, as further described below, or as a slave.

Figure 4:
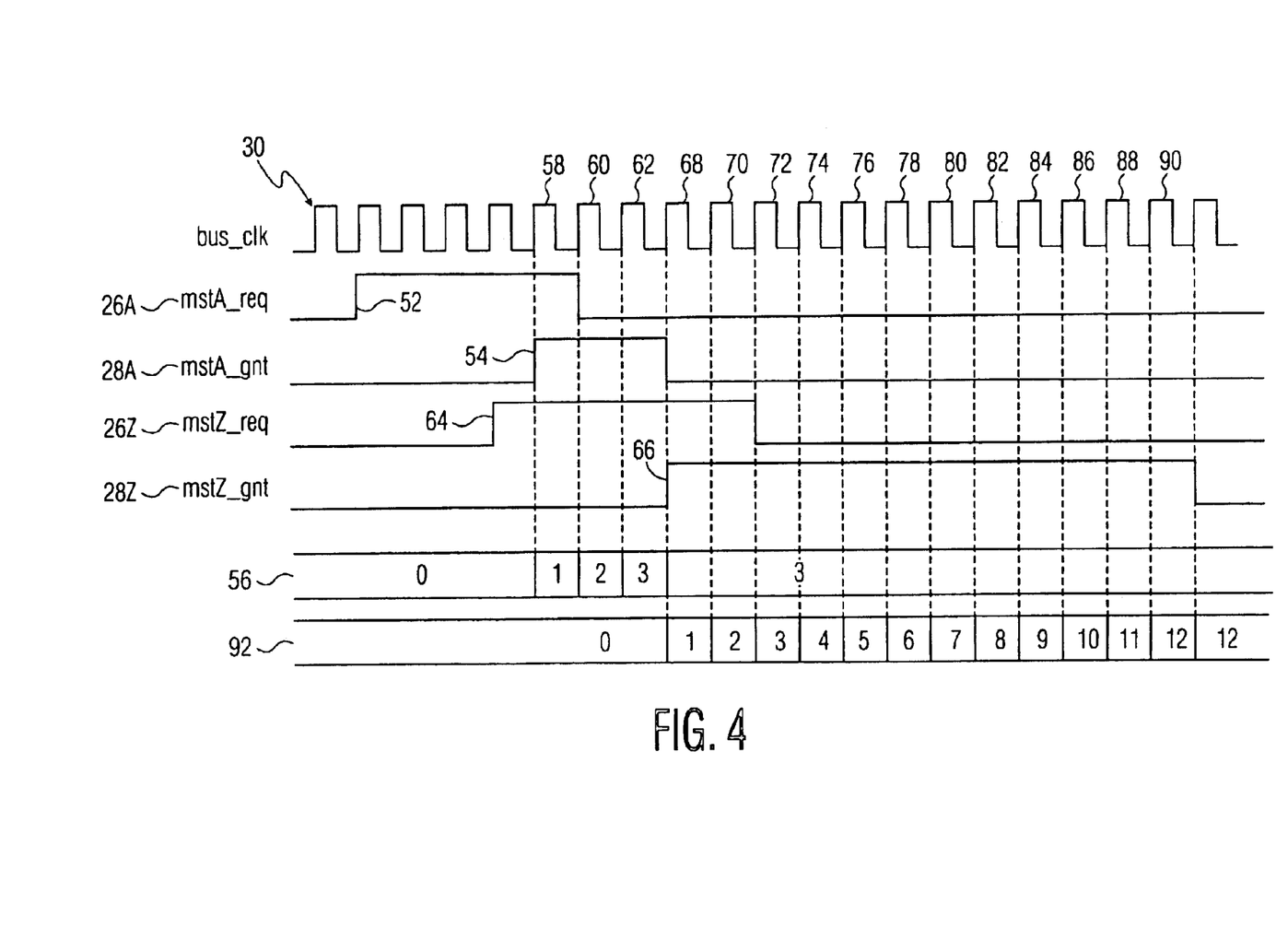
FIG. 4 is a timing diagram illustrating arbitrated data transactions of two bus masters in a bus system.

FIG. 4 depicts an example of the basic counting function of profiler 50 wherein master 14A and master 14Z sequentially have ownership of bus 12. Specifically, after master 14A outputs a request signal 52 to arbiter 18 on request line 26A, arbiter 18 outputs a grant signal 54 on grant line 28A. Profiler 50 also receives grant signal 54 on line 28A (FIG. 3). At the rising edge of grant signal 54, profiler 50 begins counting bus cycles 30 that elapse while master 14A has ownership of bus 12. In the example shown, profiler 50 initially has a cumulative bus cycle count corresponding to bus ownership by master 14A of zero counts as indicated by row 56. Profiler 50 then counts bus cycles 58, 60, and 62, resulting in an owned bus cycle count of three for master 14A.

As shown in the FIG. 4, just before arbiter 18 granted ownership of bus 12 to master 14A (cycle 58), master 14Z requested access to bus 12 by outputting request signal 64 to arbiter 18 on request line 26Z. Accordingly, when master 14A relinquishes ownership of bus 12 at the end of bus cycle 62, arbiter 18 grants master 14Z ownership of bus 12 by outputting a grant signal 66 on grant line 28Z. Profiler 50 also receives grant signal 66 at the beginning of bus cycle 68, and thus counts bus cycles 68–90, as indicated by row 92 of FIG. 4, during which master 14Z retains ownership of bus 12.

As will be described in greater detail below, profiler 50 outputs the bus cycle count data to an interface for display to a system designer, or to the system controller or CPU. When profiler 50 is used as a design tool, for example, to select the slowest system clock speed needed for the desired bus throughput, the bus cycle count data is outputted to the system designer through conventional monitoring hardware. According to known principles, the designer can then accurately estimate the bus bandwidth consumption of masters 14A–14Z in the system, and therefore calculate the slowest acceptable clock speed before implementing the design at the chip level. As is well known in the art, clock speed reductions result in reductions in power consumption.

When profiler 50 is used as part of a feedback loop within system 10, the bus cycle count data is outputted to the system controller or CPU. The CPU may include software for interpreting the bus cycle count data to determine bus bandwidth consumption. The CPU then, based on a programmable algorithm and with a clock divider circuit, dynamically adjust the system clock speed to save power. Different systems or products may require different clock speed adjustment algorithms because of differences in hysteresis and component time lags. Since profiler 50 outputs information to the CPU instead of to hardware configured to make predetermined adjustments to the system clock speed, such different systems may readily be accommodated by simply programming the CPU with new algorithms. Thus, unlike conventional, hardware-based systems, profiler 50 provides flexibility.

Figure 5:
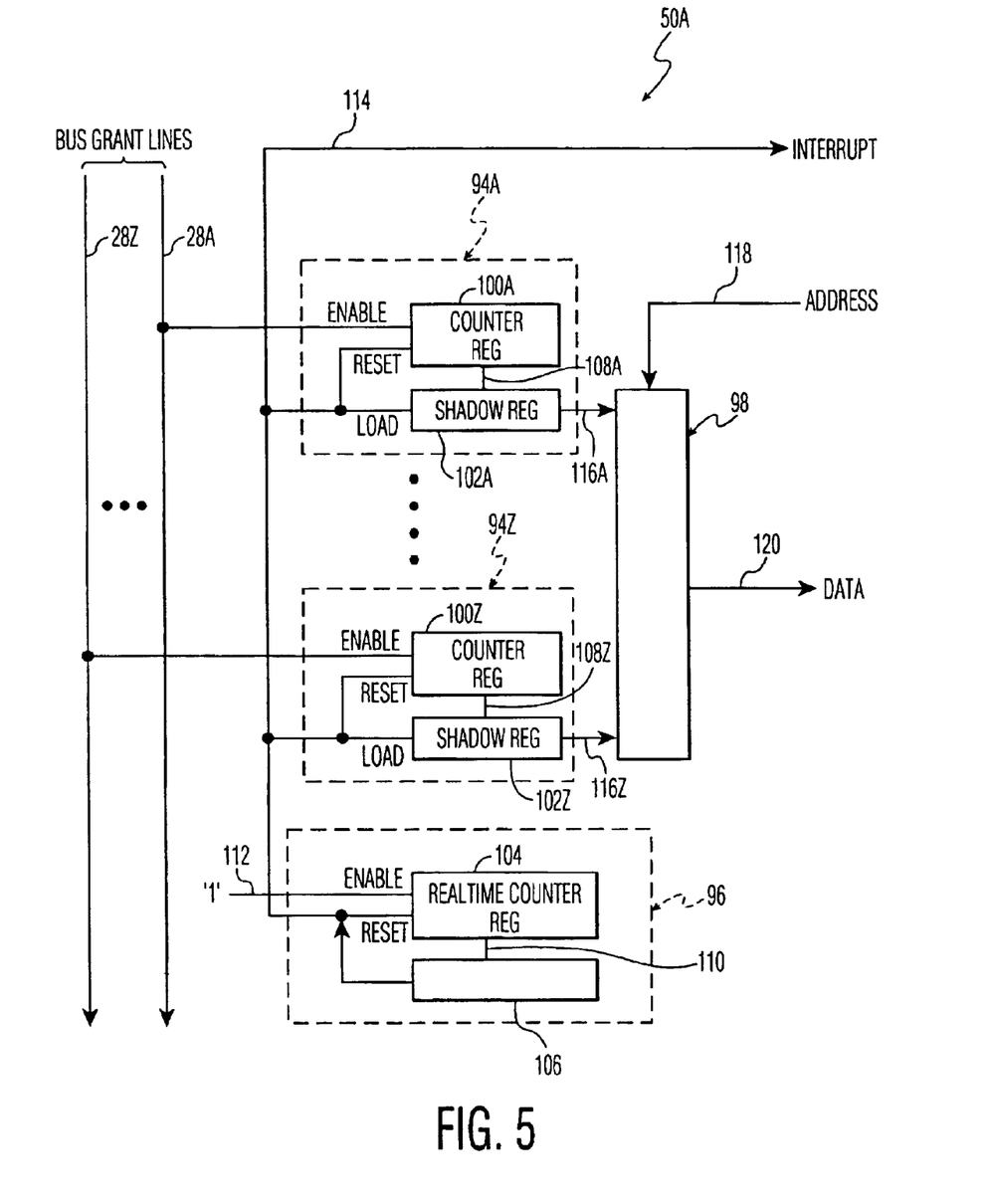
FIGS. 5 through 8 are block diagrams of the architectures of various embodiments of a bus bandwidth profiler according to the present invention.

Referring now to FIG. 5, the basic architecture of one embodiment of a profiler according to the present invention is shown. Profiler 50A generally includes a plurality of master counters 94A–94Z (two shown), a realtime counter 96, and an output stage 98. It should be noted that in this embodiment, one master counter 94A–94Z is provided for each master 14A–14Z. The internal circuitry of master counters 94A–94Z is identical. Master counter 94A, for example, includes a counter register 100A and a shadow register 102A. Realtime counter 104 includes a realtime counter register 104 and an output block 106.

As shown, counter registers 100A–100Z are connected to grant lines 28A–28Z, respectively, and to shadow registers 102A–102Z by lines 108A–108Z, respectively. Realtime counter register 104 is connected to output block 106 by line 110, and receives an enable signal on line 112. Counter registers 100A–100Z, realtime counter register 104, shadow registers 102A–102Z, and output block 106 are connected together by roll-over line 114. Finally, shadow registers 102A–102Z are connected to output stage 98 by lines 116A–116Z, respectively. As will be further described below, output stage 98 receives address inputs on line 118, and outputs data on lines 120. It should be understood that master counters 94A–94Z and realtime counter 96 are coupled to bus clock signal 30 (not shown) such that the counters can, when enabled, count cycles of bus clock signal 30.

Referring now to FIGS. 3 through 5, profiler 50A counts and reports clock cycles owned by masters 14A–14Z between profile events. Specifically, when arbiter 18 grants master 14A ownership of bus 12 by outputting grant signal 54 on granted line 28A (FIG. 4), counter register 100A of master counter 94A is enabled by grant signal 54. Accordingly, counter register 100A increments its internal bus cycle count by one count for each cycle of bus clock signal 30 occurring while grant signal 54 is present on grant line 28A (i.e., bus cycles owned by master 14A). The other master counters 94B–94Z are similarly enabled to count owned bus cycles whenever arbiter 18 outputs a grant signal to their corresponding master 14B–14Z on the appropriate grant line 28B–28Z.

Realtime counter 96, on the other hand, is a free-running counter, and is enabled over line 112 whenever profiler 50A is active. Accordingly, realtime counter register 104 continuously counts bus cycles, regardless of which master 14A–14Z owns bus 12. Realtime counter register 104 eventually reaches a maximum count value. Output block 106 monitors the actual count of realtime counter register 104, and outputs a roll-over signal or interrupt signal on roll-over line 114 when register 104 reaches its maximum count. This constitutes a profile event.

The interrupt signal is received by each shadow register 102A–102Z, thereby simultaneously shifting the current, owned bus cycles count of each master counter register 100A–100Z to its respective shadow register 102A–102Z. The interrupt signal is also received by master counter registers 100A–100Z and realtime counter register 104, causing each register to simultaneously reset to zero counts. Additionally, the interrupt signal is provided on roll-over line 114 to external hardware (not shown) such as an interrupt controller or the system CPU to indicate that the bus cycle count data corresponding to the elapsed time between the last profile event and the current profile event is available for reading.

The system CPU may address output stage 98 over address line 118 to move bus cycle count data from shadow registers 102A–102Z to output stage 98 over lines 116A–116Z, respectively. The requested data may then be read by to the CPU over data lines 20 according to principles well known in the art.

As should be apparent from the foregoing, the time between profile events of profiler 50A is substantially constant because the maximum count value of realtime counter register 104 is always the same. As such, profiler 50A provides owned bus cycle counts relating to each of masters 14A–14Z on a substantially regular, periodic basis.

It should also be apparent that the bus cycle count data is simultaneously shifted from master counters 94A–94Z, as opposed to being sequentially obtained. In a realtime system, sequential sampling results in less accurate data because a data "snap-shot" is not provided. Instead, the CPU may read master 14A, then master 14B, then master 14C, and so on. By the time the CPU reads data from the last master of interest, the previously read data is outdated. For example, if the CPU reads five owned bus cycles from master counter 94A at realtime count 15, five owned bus cycles from master counter 94B at realtime count 25, and five owned bus cycles from master counter 94C at realtime count 35, then at realtime count 35, the CPU assumes the cumulative owned bus cycles is 15 (five for each of masters 14A–14C). Clearly, however, master 14A may have owned additional bus cycles between realtime counts 16–35, and master 14B may have owned additional bus cycles between realtime counts 26–35. As such, in a sequential sampling system, the owned bus cycle data, and therefore the bus bandwidth consumption measurements, are skewed.

Profiler 50A, on the other hand, simultaneously records the owned bus cycles of all masters 14A–14Z at the profile event. As indicated above, when realtime counter 96 outputs an interrupt signal, the elapsed bus cycle counts since the last interrupt signal is known because the maximum count of realtime counter register 104 is known. Since, upon receipt of the interrupt signal, all master counters 94A–94Z simultaneously shift owned bus cycle data to their corresponding shadow registers 102A–102Z, the number of owned bus cycles for each master 14A–14Z that occurred between interrupt signals is accurately captured.

Figure 6:
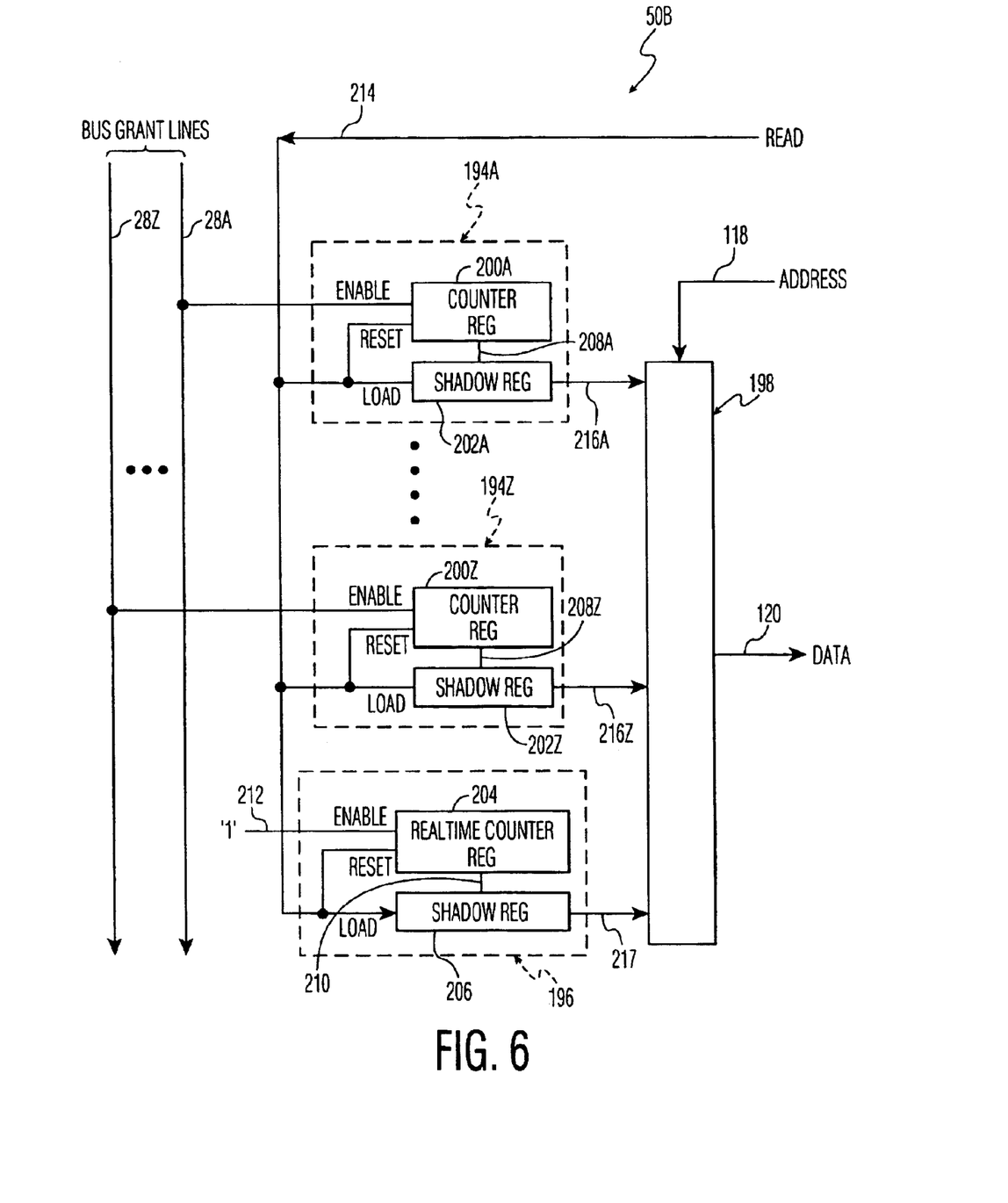

FIG. 6 shows another embodiment of a profiler according to the present invention. Profiler 50B is substantially similar to profiler 50A. Accordingly, as is the case for the remaining embodiments described herein, the reference designations for like components have been retained, but increased by 100. Profiler 50B includes a separate master counter 194A–194Z (two shown) for each master 14A–14Z. Unlike realtime counter 96 of profiler 50A, realtime counter 196 of profiler 50B includes a shadow register 206, and does not generate an interrupt signal. Instead, the system CPU or other hardware (not shown) provides a read signal on line 214 which constitutes the profile event. The read signal simultaneously causes master counters 194A–194Z to shift their owned bus cycle data to shadow registers 202A–202Z, respectively. Realtime counter 196 similarly responds to the read signal by shifting the elapsed bus cycle count to shadow register 206. Additionally, the read signal on line 214 is received by master counter registers 200A–200Z and realtime counter register 204, thereby resetting each counter register to zero. The bus cycle count data is outputted over lines 216A–216Z and 217, through output stage 198, to an interface or system CPU. Bus bandwidth consumption calculations are then carried out according to known principles.

Unlike profiler 50A of FIG. 5, profiler 50B has a polling architecture which is responsive to system read signals. As explained above, however, each such read signal results in a "snap-shot" of the data of all master counters 194A–194Z and realtime counter 196. Thus, like profiler 50A, profiler 50B overcomes the deficiencies associated with sequential polling systems.

Figure 7:
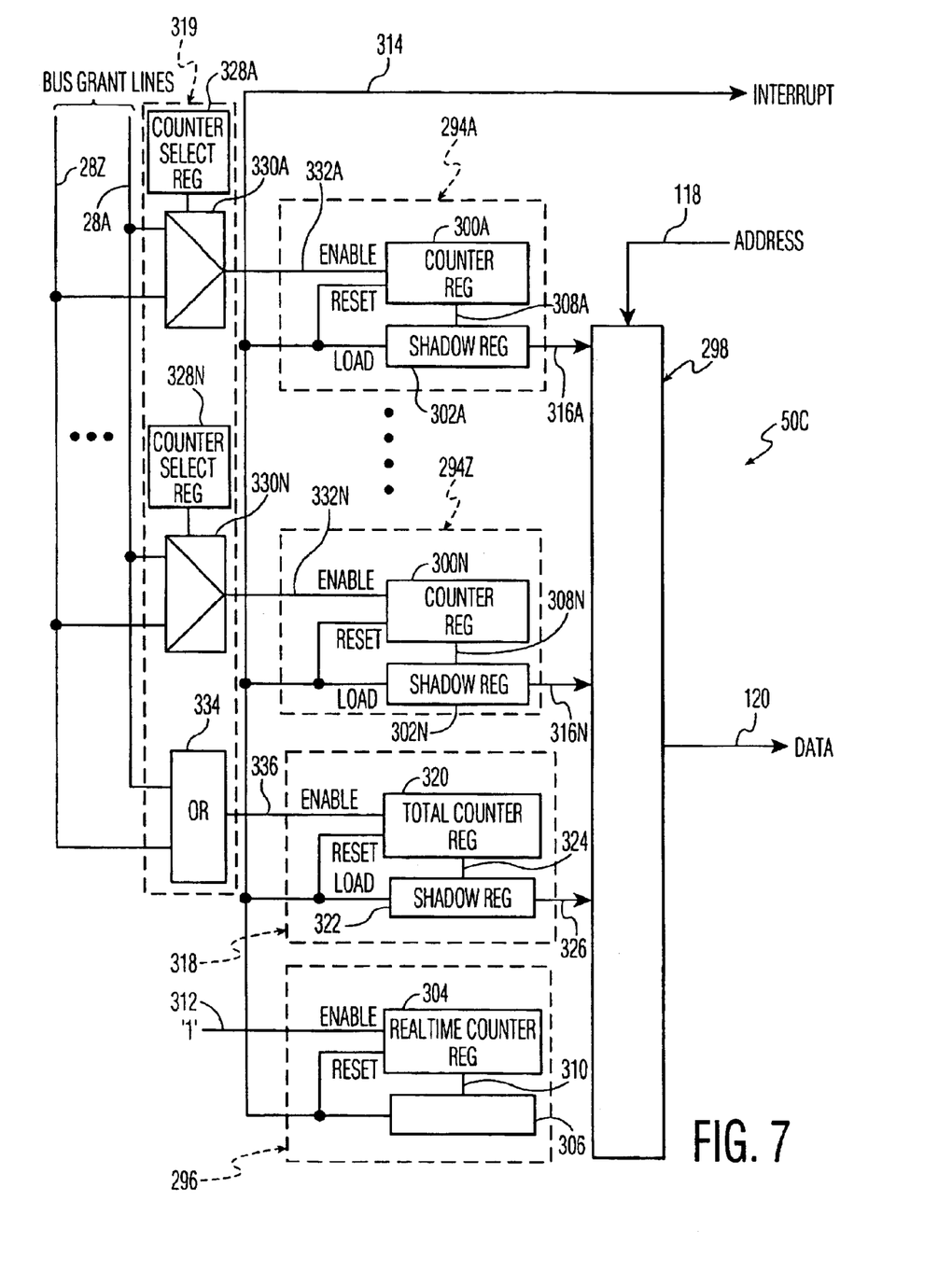

FIG. 7 illustrates yet another embodiment of a profiler according to the present invention. Profiler 50C is similar to profiler 50A of FIG. 5, but includes fewer master counters than the number of masters 14A–14Z, and provides an additional total counter 318. Specifically, profiler 50C includes a plurality of master counters 294A–294N (two shown), a realtime counter 296, a total counter 318, an output stage 298, and a configuration circuit 319. Master counters 294A–294N include master counter registers 300A–300N and corresponding shadow registers 302A–302N, respectively, connected substantially as described above. Similarly, realtime counter 296 includes realtime counter register 304 and output block 306, and is identical to realtime counter 96 of FIG. 5. Total counter 318 includes a total counter register 320 connected to a shadow register 322 by line 324. The output of shadow register 322 is connected to output stage 298 by line 326. Total counter register 320 and shadow register 322 are connected to line 314 in the same manner as master counter registers 300A–300N and shadow registers 302A–302N are connected to line 314.

Configuration circuit 319 includes a plurality of select registers 328A–328N (one for each master counter 294A–294Z), and a corresponding plurality of connection blocks 330A–330N controlled by select registers 328A–328N, respectively. Select registers 328A–328N have control inputs (not shown) which permit the user or the system CPU to configure connection blocks 330A–330N as further described below. Connection block 330A–330N have outputs connected to master counter registers 300A–300N by lines 332A–332N, respectively. Each connection block 330A–330N has a plurality of inputs connected to all of grant lines 28A–28Z which correspond to masters 14A–14Z. Configuration circuit 319 also includes an OR gate circuit 334 which has grant lines 28A–28Z as inputs, and provides an enable output to total counter register 320 over line 336. It should be understood that each of master counters 294A–294N, total counter 318, and realtime counter 296 are coupled to bus clock signal 30 (not shown) such that the counters can, when enabled, count cycles of bus clock signal 30.

In operation, a user provides control signals to select registers 328A–328N to select the subset of the plurality of masters 14A–14Z for counting. For example, the user may command select register 328A to configure connection block 330A such that grant line 28C is connected to enable line 332A. In that case, master counter 294A will be enabled by a grant signal to master 14C, and will count bus cycles owned by master 14C in the manner described above. The remaining select registers 328B–328N are similarly used to select other masters for counting.

It should be understood that profiler 50C does not individually monitor and count cycles for each of the plurality of masters 14A–14Z during any given period of time. In practice, some masters 14A–14Z are very low bandwidth devices. If a master counter were provided for every master 14A–14Z, the master counters dedicated to the low bandwidth masters 14A–14Z would be largely inactive, consuming power and silicon space, but contributing little to the bus bandwidth consumption measurement function of profiler 50C. Accordingly, by including fewer master counters 294A–294N than masters 14A–14Z, profiler 50C may have a less expensive, more efficient design. Moreover, the collective bus utilization of the non-selected masters 14A–14Z can be readily computed using bus cycle count data from total counter 318 as further described below.

After select registers 328A–328N are used to configure the connections between selected masters 14A–14Z and master counters 294A–294N, actual system monitoring can begin. As described with reference to FIG. 5, realtime counter 296 increments realtime counter register 304 after every bus cycle, thereby essentially counting elapsed time. Each master counter 294A–294N is enabled by and begins counting bus cycles upon receipt of a signal on its associated enable line 332A–332N. Each enable signal is simply a grant signal outputted by arbiter 18 on the grant line 28A–28Z to which the counter is connected. Master counters 294A–294N stop counting when the grant signal is removed. Accordingly, each master counter 294A–294N counts bus cycles owned by the master 14A–14Z to which the counter is configured.

Total counter 318, on the other hand, is enabled whenever any master 14A–14Z is granted ownership of bus 12. OR gate circuit 334 effectively connects every grant line 28A–28Z to enable line 336 of total counter 318. When arbiter 18 outputs a grant signal on any of grant lines 28A–28Z, total counter 318 is enabled and counts bus cycles until the grant signal is removed. As such, total counter 318 maintains a running count of the total number of bus cycles collectively owned by masters 14A–14Z.

Like profiler 50A of FIG. 5, profiler 50C has an interrupt-driven architecture. Realtime counter register 304 counts elapsed bus cycles until it reaches its maximum count value. When the maximum count is reached, output block 306 produces an interrupt signal on roll-over line 314 (the profile event). Shadow registers 302A–302N of master counters 294A–294N and shadow register 322 of total counter 318 respond to the interrupt signal by storing the number of bus cycle counts present in their respective counter registers (i.e., master counter registers 300A–300N and total counter register 320, respectively). The interrupt signal also resets master counter registers 300A–300N and total counter register 320 to zero, and notifies the user or the system CPU that valid data relevant to the time period between the last two profile events is available for reading. This data may be shifted from shadow registers 302A–302N and 322 to output stage 298, and read by the CPU in the manner described above.

The bus bandwidth consumption of masters 14A–14Z selected for counting by master counters 294A–294N may be calculated as described above. The bus bandwidth consumed collectively by the remaining masters 14A–14Z (those not counted by master counters 294A–294N) may be derived by simply summing the number of bus cycles owned by the selected masters 14A–14Z, and subtracting that sum from the total number of owned bus cycles counted by total counter 318. The result is the total number of bus cycles owned by non-selected masters 14A–14Z, which yields the total bus bandwidth consumption of the non-selected masters 14A–14Z.

Figure 8:
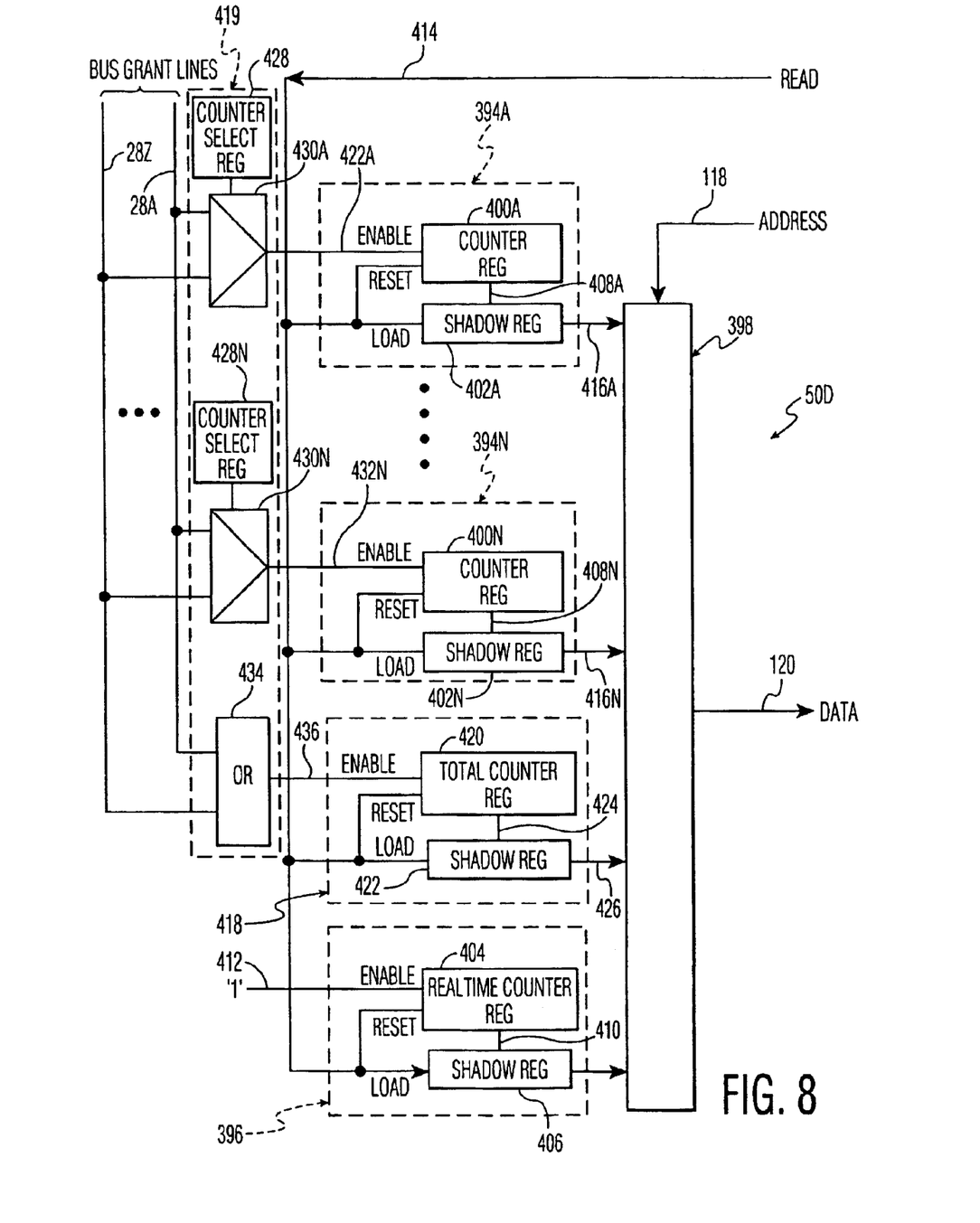

FIG. 8 illustrates another embodiment of a profiler according to the present invention. Profiler SOD is simply profiler 50C converted into a polling architecture: The number of master counters 394A–394N in profiler 50D is also smaller than the number of system masters 14A–14Z. Profiler 50D includes a total counter 418 and a configuration circuit 419 identical to those present in profiler 50C. Realtime counter 296 of profiler 50C, however, has been replaced with realtime counter 396, which is identical to realtime counter 196 of profiler 50B (FIG. 6). Accordingly, once configured as described above, profiler 50D operates like profiler 50B, except not all masters 14A–14Z are counted, and a total number of owned bus cycles is provided by total counter 418 upon the occurrence of a profile event (i.e., a read signal from the CPU over line 414).

Figure 9:
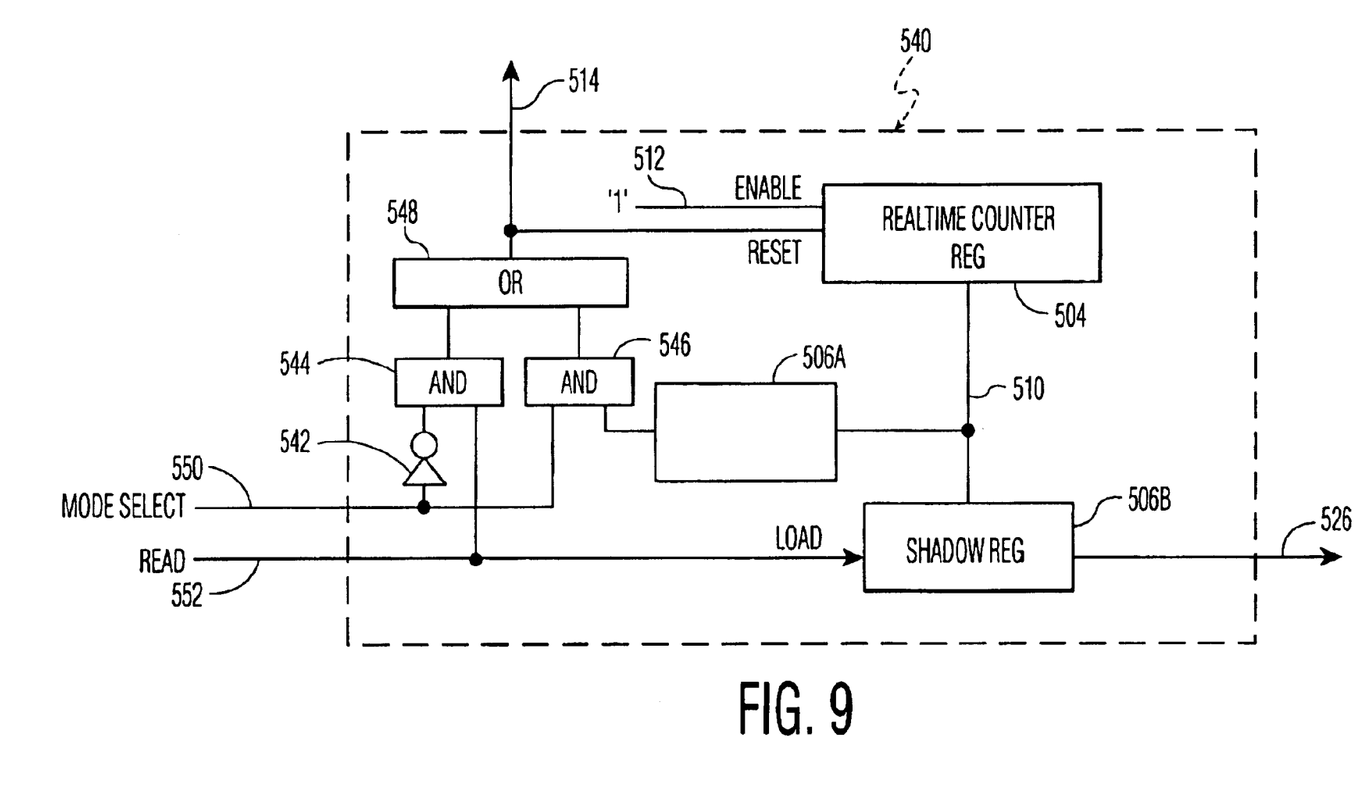
FIG. 9 is a block diagram of a mode select circuit which may be incorporated into any of the embodiments of FIGS. 5 through 8.

FIG. 9 illustrates a mode select circuit 540 which, when adapted to any of profilers 50A–50D, permits the profiler to operate in either an interrupt-driven mode or a polled mode. Mode select circuit 540 includes a realtime counter register 504, an output block 506A, a shadow register 506B, an inverter 542, a pair of AND gates 544, 546, and an OR gate 548. Mode select circuit 540 has as inputs a mode select signal 550 and a read signal 552, both of which may be generated by the system CPU. Mode select signal 550 is routed to the input of inverter 542 and one input of AND gate 546. The other input to AND gate 546 is provided by output block 506A. Read signal 552 is routed to shadow register 506B and an input of AND gate 544. The other input to AND gate 544 is provided, by the output of inverter 542. The outputs of AND gates 544, 546 provide inputs to OR gate 548. The output of OR gate 548 (on line 514) provides a reset input to realtime counter 504, and is connected to the remaining components of the profiler in the same manner as lines 114, 214, 314, and 414 of FIGS. 5 through 8, respectively. Realtime counter register 504 is enabled by line 512 whenever the profiler is operating. As shown, realtime counter register 504 is also connected to both output block 506A and shadow register 506B by line 510. The output of shadow register 506B may be connected to any of output stages 98, 198, 298, 398 (not shown).

In operation, mode select circuit 540 generates a profile event when the system CPU provides read signal 552, or when realtime counter register 504 reaches its maximum count limit, depending upon the state of mode select signal 550. If mode select signal 550 is high (interrupt mode), a logic high signal is provided to one input of AND gate 546 and a logic low signal is provided to one input of AND gate 544 (after mode select signal 550 is inverted by inverter 542). As should be apparent, with one input at a logic low, AND gate 544 cannot produce an output. Accordingly, read signal 552 cannot produce a profile event. On the other hand, when realtime counter 504 reaches its maximum count value, output block 506A provides a logic high signal to the other input of AND gate 546, which in turn provides a logic high signal to OR gate 548. OR gate 548 then resets realtime counter register 504, and provides an interrupt signal on line 514 to the other counters in the profiler. As explained above, this signal causes the counters to shift their bus cycle count data to their respective shadow registers and reset to zero.

When mode select signal 550 is low (polled mode), a logic high signal is present at one input of AND gate 544 (from inverter 542), and a logic low signal is present at one input of AND gate 546, thereby disabling interrupt mode profile events. When the CPU outputs a logic high read signal 552, the bus cycle counts of realtime counter register 504 are shifted to shadow register 506B. Also, both inputs to AND gate 544 are high, producing a read signal on line 514 (the profile event) and resetting realtime counter register 504. As before, the read signal on line 514 shifts the counted bus cycle data of the counters to their respective shadow registers, and resets the counters to zero.

Although the present invention has been shown and described in detail, the same is to be taken by way of example only and not by way of limitation. Numerous changes can be made to the embodiments described above without departing from the scope of the invention. This application is therefore intended to cover any variations, uses, or adaptations of the invention using its general principles. Further, this application is intended to cover such departures from the present disclosure as come within known or customary practice in the art to which this invention pertains.

What is claimed is:

1. A bus bandwidth consumption profiler for a computer system having a plurality of masters connected to a bus, and a bus arbiter coupled to the masters for outputting grant signals to the masters selected to own the bus, the profiler including:

a plurality of master counters coupled to the bus arbiter and the plurality of masters, each master counter responding to a grant signal outputted to its corresponding master by counting bus cycles owned by the corresponding master;

a plurality of shadow registers, each of the plurality of master counters having an associated shadow register coupled thereto; and a realtime counter for counting bus cycles between profile events, wherein the realtime counter responds to a profile event by providing to the system a total number of bus cycles counted since a prior profile event, and by resetting the total number of bus cycles counted to zero, and each master counter responds to the profile event by storing in the associated shadow register, for output to the system, the number of bus cycles owned by its corresponding master since a prior profile event, and by resetting the number of owned bus cycles to zero, and wherein values stored in the associated shadow registers do not change between profile events.

2. The profiler of claim 1 wherein the profile event is an interrupt signal generated by the realtime counter.

3. The profiler of claim 1 wherein the profile event is receipt of a read signal generated by the system.

4. The profiler of claim 1, further including a mode select circuit coupled to the master counters and the realtime counter, the mode select circuit being responsive to a mode signal having a first state by defining the profile event as an interrupt signal generated by the realtime counter, and being responsible to the mode signal having a second state by defining the profile event as a read signal generated by the system.

5. The profiler of claim 4 wherein the mode select circuit includes a first AND gate having a first input for receiving the interrupt signal, a second input for receiving the mode signal, and an output, a second AND gate having a first input for receiving the read signal, a second input, and an output, an inverter having an input for receiving the mode signal, and an output connected to the second AND gate second input, and an OR gate having a first input connected to the first AND gate output, a second input connected to the second AND gate output, and an output coupled to the master counters and the realtime counter.

6. A bus bandwidth consumption profiler for a computer system having a plurality of masters connected to a bus, and a bus arbiter coupled to the masters for granting the masters ownership of the bus, the profiler including:

a plurality of master counters coupled to the bus arbiter, the plurality of master counters being less than the plurality of masters, each of the master counters being configurable to count bus cycles owned by any one of the plurality of masters;

a plurality of shadow registers, each of the plurality of master counters having an associated shadow register coupled thereto; and a realtime counter for counting bus cycles between profile events, wherein the realtime counter responds to a profile event by providing to the system the number of elapsed bus cycles counted since a prior profile event, and by resetting the number of elapsed bus cycles counted to zero, and each master counter responds to the profile event by storing in the associated shadow register, for output to the system, the number of bus cycles owned since the prior profile event by the master to which the master counter is configured, and by resetting the number of owned bus cycles to zero, and wherein values stored in the associated shadow registers do not change between profile events.

7. The profiler of claim 6 wherein the profile event is an interrupt signal generated by the realtime counter.

8. The profiler of claim 6 wherein the profile event is receipt of a read signal generated by the system.

9. The profiler of claim 6, further including a mode select circuit coupled to the master counters and the realtime counter, the mode select circuit being responsive to a mode signal having a first state by defining the profile event as an interrupt signal generated by the realtime counter, and being responsible to the mode signal having a second state by defining the profile event as a read signal generated by the system.

10. The profiler of claim 9 wherein the mode select circuit includes a first AND gate having a first input for receiving the interrupt signal, a second input for receiving the mode signal, and an output, a second AND gate having a first input for receiving the read signal, a second input, and an output, an inverter having an input for receiving the mode signal, and an output connected to the second AND gate second input, and an OR gate having a first input connected to the first AND gate output, a second input connected to the second AND gate output, and an output coupled to the master counters and the realtime counter.

11. The profiler of claim 6, further including a total counter coupled to the bus arbiter for counting the combined number of bus cycles owned by the plurality of masters, the total counter responding to the profile event by storing the combined number of owned bus cycles for output to the system, thereby permitting calculation of combined bandwidth consumption between profile events of the masters to which a master counter is not configured.

12. The profiler of claim 6, further including a plurality of select registers individually coupled to the plurality of master counters, each select register responding to a control signal by configuring its corresponding master counter to count bus cycles owned by a selected one of the plurality of masters.

13. A bus bandwidth consumption profiler for enabling dynamic adjustment of the operating frequency of a bus in a CPU-based system in response to the bus utilization of a plurality of masters connected to the bus and granted ownership of the bus by a bus arbiter, the profiler including:
a realtime counter for counting bus cycles between profile events, the realtime counter responding to a profile event by storing the total number of bus cycles counted since the prior profile event, and by resetting the total number of bus cycles counted to zero;
a plurality of master counters coupled to the bus arbiter for counting bus cycles owned by the plurality of masters, each master counter coupled to an associated shadow register, each master counter responding to a profile event by storing, in the associated shadow register, the number of bus cycles owned since a prior profile event by the master corresponding to the master counter, and by resetting the number of owned bus cycles to zero; and
an output stage for receiving the stored total number of bus cycles and the stored number of owned bus cycles from the realtime counter and the plurality of shadow registers, respectively, and outputting the stored total number of bus cycles and the stored number of owned bus cycles to the CPU for enabling the CPU to determine the bus bandwidth consumption of the masters since the prior profile event, to thereby reduce the operating frequency during periods of low consumption, and increase the operating frequency during periods of high consumption;
wherein the contents of the shadow registers do not change between profile events.

14. The profiler of claim 13 wherein the profile event is an interrupt signal generated by the realtime counter.

15. The profiler of claim 13 wherein the profile event is receipt of a read signal generated by the CPU.

16. The profiler of claim 13, further including a mode select circuit coupled to the master counters and the realtime counter, the mode select circuit being responsive to a mode signal having a first state by defining the profile event as an interrupt signal generated by the realtime counter, and being responsible to the mode signal having a second state by defining the profile event as a read signal generated by the CPU.

17. The profiler of claim 13 wherein the plurality of master counters is less than the plurality of masters, each master counter being configurable to count bus cycles owned by any one of the plurality of masters.

18. The profiler of claim 17, further including a total counter coupled to the bus arbiter for counting the combined number of bus cycles owned by the plurality of masters, the total counter responding to the profile event by storing the combined number of owned bus cycles for output to the output stage, thereby enabling the CPU to calculate the combined bandwidth consumption between profile events of the masters to which a master counter is not configured.

19. A method for determining the minimum operating frequency for a computer system having a plurality of masters connected to a bus, and a bus arbiter coupled to the masters for granting the masters ownership of the bus, comprising:
counting, with a plurality of counters, for at least some masters of the plurality of masters, the number of bus cycles owned by each master between a first and a second profile event;
counting the total number of bus cycles occurring between the profile events;
simultaneously storing the numbers of owned bus cycles and the number of total bus cycles in shadow registers associated with the plurality of counters, upon the occurrence of the second profile event;
computing based at least in part upon the content of the shadow registers subsequent to the second profile event, for the at least some masters, bus bandwidth utilization; and
using the bus bandwidth utilization to determine the minimum operating frequency of the bus;
wherein the contents of the shadow registers do not change between profile events.

20. A computer system, including:
a bus;
a plurality of masters connected to the bus;
a bus arbiter for granting ownership of the bus to the plurality of masters; and
a bus bandwidth consumption profiler for enabling dynamic adjustment of the operating frequency of the bus in response to the bus utilization of the plurality of masters, the profiler having
a realtime counter for counting bus cycles between profile events, the realtime counter responding to a profile event by storing the total number of bus cycles counted since the prior profile event, and by resetting the total number of bus cycles counted to zero,
a plurality of shadow registers;
a plurality of master counters coupled to the bus arbiter for counting bus cycles owned by the plurality of masters, each master counter coupled to an associated shadow register, each master counter responding to a profile event by storing, in the associated shadow register, the number of bus cycles owned since a prior profile event by the master corresponding to the master counter, and by resetting the number of owned bus cycles to zero, and
an output stage for receiving the stored total number of bus cycles and the stored number of owned bus cycles from the realtime counter and the plurality of shadow registers, respectively, and outputting the stored total number of bus cycles and the stored number of owned bus cycles to the CPU for enabling the CPU to determine the bus bandwidth consumption of the masters since the prior profile event, to thereby reduce the operating frequency during periods of low consumption, and increase the operating frequency during periods of high consumption;
wherein values stored in the shadow registers do not change between profile events.

* * * * *